US007129287B1

(12) United States Patent
Lee et al.

(10) Patent No.: US 7,129,287 B1
(45) Date of Patent: *Oct. 31, 2006

(54) CLAY NANOCOMPOSITES PREPARED BY IN-SITU POLYMERIZATION

(75) Inventors: L. James Lee, Columbus, OH (US); Changchun Zeng, Columbus, OH (US)

(73) Assignee: The Ohio State University, Columbus, OH (US)

( * ) Notice: Subject to any disclaimer, the term of this patent is extended or adjusted under 35 U.S.C. 154(b) by 362 days.

This patent is subject to a terminal disclaimer.

(21) Appl. No.: 10/425,565

(22) Filed: Apr. 29, 2003

Related U.S. Application Data

(60) Provisional application No. 60/376,365, filed on Apr. 29, 2002.

(51) Int. Cl.
*C08K 3/34* (2006.01)

(52) U.S. Cl. ............... 524/445; 523/202; 523/205; 523/209; 523/216; 524/236; 524/447; 524/789; 564/291; 564/298

(58) Field of Classification Search ........ 523/202, 523/205, 209, 216; 524/445, 447, 789, 236; 564/291, 298
See application file for complete search history.

(56) References Cited

U.S. PATENT DOCUMENTS

| | | | | |
|---|---|---|---|---|
| 3,615,384 | A * | 10/1971 | Gipstein et al. | 430/75 |
| 5,076,959 | A * | 12/1991 | Barker et al. | 252/182.13 |
| 6,271,297 | B1 * | 8/2001 | Ishida | 524/445 |
| 6,646,072 | B1 * | 11/2003 | Klendworth et al. | 526/130 |
| 6,759,446 | B1 * | 7/2004 | Lee et al. | 521/83 |

| | | | | |
|---|---|---|---|---|
| 2005/0004243 | A1 * | 1/2005 | Lee et al. | 521/82 |

OTHER PUBLICATIONS

Usuki, A. et al., Swelling Behavior of Montmorillonite Cation Exchanged for ω-amino Acids by ε-caprolactam, 0.*J. Mater. Res.* 1993, 8, 1174.
Usuki, A. et al., Synthesis of Nylon 6-clay Hubrid, 0.*J. Mater. Res.* 1993, 8,1180.
Kojima, Y., et al., Mechanical Properties of Nylon 6-clay Hybrid, 0.*J. Mater. Res.* 1993, 8,1185.
Pinnavaia, T. J. et al., Clay-Reinforced Epoxy Nanocomposites: Synthesis, Properties, and Mechanism of Formation, *ACS Symp. Ser.* 1996, 622, 250.
Lan, T. et al., Clay-Reinforced Epoxy Nanocomposites, *Chem. Mater.* 1994, 6, 2216.
Shi, H et al., Interfacial Effects on the Reinforcement Properties of Polymer-Organoclay Nanocomposites, *Chem. Mater.* 1996, 8,1584.
Wang, Z. et al., Hybrid Organic-Inorganic Nanocomposites: Exfoliation of Magadiite Nanolayers in an Elastomeric Epoxy Polymer, *Chem. Mater.* 1998, 10, 1820.
Okada, A. et al., The Chemistry of Polymer-Clay Hybrids, *Mater. Sci. Eng.* 1995, C3,109.

(Continued)

*Primary Examiner*—Peter Szekely
(74) *Attorney, Agent, or Firm*—Standley Law Group LLP

(57) ABSTRACT

A method for preparing exfoliated clay nanocomposites by in-situ polymerization comprising the steps of (a) providing a mixture of at least one type of monomer and at least one type of organophilic clay; and (b) initiating an in-situ polymerization reaction in the mixture so as to cause the at least one type of monomer to polymerize thereby forming the exfoliated clay nanocomposite. The exfoliated clay nanocomposite produces an x-ray diffraction pattern that is substantially devoid of an intercalation peak. The exfoliated clay nanocomposite may then be used as a masterbatch.

35 Claims, 11 Drawing Sheets

OTHER PUBLICATIONS

Messersmith, P. et al., Synthesis and Characterization of Layered Silicate-Epoxy Nanocomposites, *Chem. Mater.* 1994, 6,1719.

Gilman, J. W., Flammability and Thermal Stability Studies of Polymer-Layered-Silicate (Clay) Nanocomposites, *Appl. Clay Sci.* 1999, 15, 3 1.

Dietsche, F.; Thermal Properties and Flammability of Acrylic Nanocomposites Based Upon Organophilic Layered Silicates, *Polym. Bull.* 1999, 43, 395.

Porter, D. et al., Nanocomposite Fire Retardants- A Review, *Fire Mater.* 2000, 24,45.

Gilman, J. W. et al., Flammability Properties of Polymer-Layered-Silicate Nanocomposites. Polypropropylene and Polystyrene Nanocomposites, *Chem. Mater.* 2000, 12, 1866.

Yano, K. et al., Synthesis and Properties of Polyimide-Clay Hubrid, *J. Polyrn. Sci., Part A: Polym. Chem.* 1993, 31, 2493.

Lan, T. et al. On the Nature of Polyimide-Clay Hybrid Composites, *Chem. Mater.* 1994, 6,573.

Messersmith, P. B. et al., Synthesis and Barrier Properties of Poly(ϵ-Caprolactone)-Layered Silicate Nanocomposites, *J. Polym. Sci., Part A: Polym. Chem.* 1995, 33, 1047.

Giannelis, E. P., Polymer Layered Silicate Nanocomposites, *Adv. Mater.* 1996, 8,29.

Krishnamoorti, R. et al., Structure and Dynamics of Polymer-Layered Silicate Nanocomposites, *Chem. Mater.* 1996, 8, 1728.

Vaia, R. A. et al., Lattice Model of Polymer Melt Intercalation in Organically-Modified Layered Silicates, *Macromolecules* 1997, 30, 7990.

Vaia, R. A. et al., Polymer Melt Intercalation in Organically-Modified Layered Silicates: Model Predictions and Experiment, *Macromolecules* 1997, 30, 8000.

Balazs, A. C. et al., Modeling the Interactions Between Polymers and Clay Surfaces Through Self-Consistent Field Theory, *Macromolecules* 1998, 31,8370.

Ginzburg, V. V. et al., Calculating Phase Diagrams of Polymer-Platelet Mixtures Using Density Functional Theory: Implications for Polymer/Clay Composites, *Macromolecules* 1999, 32, 568 1.

Ginzburg, V. V. et al., Theoretical Phase Diagrams of Polymer/Clay Composites: The Role of Grafted Organic Modifiers, *Macromolecules* 2000, 33, 1089.

Lan, T. et al., Mechanism of Clay Tactoid Exfoliation in Epoxy-Clay Nanocomposites, *Chem. Mater.* 1995, 7, 2144.

Brown, J. M. et al., Thermoset-Layered Silicate Nanocomposites. Quaternary Ammonium Montmorillonite with Primary Diamine Cured Epoxies, *Chem. Mater.* 2000, 12,3370.

Wang, M. S. et al., Clay-Polymer Nanocomposites Formed from Acidic Derivatives of Montmorillonite and an Epoxy Resin, *Chem. Mater.* 1994, 6, 468.

Noh, M. et al., Synthesis and Characterization of PS-Clay Nanocomposite by Emulsion Polymerization, *Polym. Bull.* 1999, 42, 619.

Lee, D. C. et al., Preparation and Characterization of PMMA-Clay Hybrid Composite by Emulsion Polymerization, *J. Appl. Polym. Sci.* 1996, 61, 1117.

Okamoto, M. et al., Synthesis and Structure of Smectic Clay/Poly(methyl Methacrylate) and Clay/Polystyrene Nanocomposites via in Situ Intercalative Polymerization, *Polymer* 2000, 41, 3887.

Biasci, L. et al., Functionalization of Montmorillonite by Methyl Methacrylate Polymers Containing Side-Chain Ammonium Cations, *Polymer* 1994, 35, 3296.

Doh, J. G. et al., Synthesis and Properties of Polystyrene-Organoammonium Montmorillonite Hybrid, *Polym. Bull.* 1998, 41, 511.

Dietsche, F. et al., Translucent Acrylic Nanocomposites Containing Anisotropic Laminated Nanoparticles Derived from Intercalated Layered Silicates, *J Appl. Polym. Sci.* 2000, 75, 396.

Weimer, M. W. et al., Direct Synthesis of Dispersed Nanocomposites by in Situ Living Free Radical Polymerization Using a Silicate-Anchored Initiator, *J. Am. Chem. Soc.* 1999,121,1615.

Huang, X. et al., Synthesis of a PMMA-Layered Silicate Nanocomposite by Suspension Polymerization, *Polym. Prepr. (Am. Chem. Soc., Div. Polym. Chem.)* 2000, 41, 52 1.

Bandyopadhyay, S. et al., Thermal and Thermo-Mechanical Properties of PMMA Nanocomposites, *Polym. Mater. Sci. Eng.* 2000, 82, 208.

Blumstein, A., Polymerization of Adsorbed Monolayers. I. Preparation of the Clay-Polymer Complex, *J. Polym. Sci., Part A* 1965, 3, 2653.

Solomon, D. H. et al., Reactions Catalyzed by Minerals. Part I. Polymerization of Styrene, *J. Appl. Polym. Sci.* 1965, 9, 1261.

Solomon, D. H. et al., Reactions Catalyzed by Minerals. Part III. The Mechanism of Spontaneous Interlamellar Polymerizations in Aluminosilicates, *J. Appl. Polym. Sci.* 1968, 12, 1253.

Cody, C. A. et al., Studies of Fundamental Organoclay Rheolocial Relationships, *NLGI Spokesman* 1986, 49,437.

Magauran, E. D. et al., Effective Utilization of Organoclay Dispersants, *NLGI Spokesman* 1987, 50, 453.

Fu, X. et al., Polymer-Clay Nanocomposites: Exfoliation of Organophilic Montmorillonite Nanolayers in Polystyrene, *Polymer* 2001, 42, 807.

Vaia, R. A. et al., Kinetics of Polymer Melt Intercalation, *Macromolecules* 1995, 28, 8080.

Vaia, R. A. et al., Microstructural Evolution of Melt Intercalated Polymer-Organically Modified Layered Silicates Nanocomposites, *Chem. Mater.* 1996, 8,2628.

Krishnamoorti, R. et al., Rheology of End-Tethered Polymer Layered Silicate Nanocomposites, *Macromolecules* 1997, 30, 4097.

Ren, J. et al., Linear Viscoelasticity of Disordered Polystyrene-Polyisoprene Block Copolymer Based Layered-Silicate Nanocomposites, *Macromolecules* 2000, 33, 3739.

Cho, J. W. et al. Nylon 6 Nanocomposites by Melt Compounding, *Polymer* 2001, 42,1083.

\* cited by examiner

CLAY NANOCOMPOSITES PREPARED BY IN-SITU POLYMERIZATION

This application claims the benefit of U.S. Provisional Patent Application No. 60/376,365, filed on Apr. 29, 2002, which is incorporated herein by reference.

The present invention was made with Government support under Grant No. EEC-9815677 awarded by the National Science Foundation. The United States Government may have certain rights to this invention under 35 U.S.C. §200 et seq.

TECHNICAL FIELD OF THE INVENTION

The present invention is in the field of nanocomposites and includes methods of producing nanocomposites, compositions of matter, and articles constructed from nanocomposite materials.

BACKGROUND OF THE INVENTION

Since Toyota's pioneering work on polymer layered silicate nanocomposites, a great deal of research has been carried out in this field over the past decade. With the addition of a very small amount of nanofiller into the polymer matrix, these nanocomposites exhibit substantial increase in many physical properties, including mechanical properties (tensile modulus and strength, flexural modulus, and strength), thermal stability, flame retardance, and barrier resistance. Smectite clays, such as montmorillonite (MMT), are of particular interest because they offer a high aspect ratio (10–1000) and a high surface area. Montmorillonite is hydrophilic in nature, which hinders the homogeneous dispersion in the organic polymer phase. Ion exchange of the interlayer inorganic cations (Na+, Ca2+) with organic cation renders the hydrophilic clay surface organophilic. The reduction in surface energy improves the wetting characteristics of the clay surface with polymers or monomers.

From the structural point of view, two idealized polymer/clay nanocomposites are possible: intercalated and exfoliated. Intercalation results from the penetration of polymer chains into the interlayer region and interlayer expansion. Usually the ordered layer structure is preserved and can be detected by X-ray diffraction (XRD). By contrast, exfoliation involves extensive polymer penetration and silicate crystallites delamination, and the individual nanometer-thick silicate platelets are randomly dispersed in the polymer matrix. Exfoliated nanocomposites usually provide the best property enhancement due to the large aspect ratio and surface area of the clay.

Melt intercalation and in-situ polymerization are the two most common ways of preparing polymer/clay nanocomposites. Melt intercalation involves the mixing of clay with a molten polymer matrix. The layer separation, especially exfoliation, depends on the establishment of favorable interactions between the polymer and the clay surface and the subsequent system energy reduction. In-situ polymerization involves monomer intercalation followed by polymerization. By tailoring the interaction between the monomer, the surfactant, and the clay surface, the exfoliated nanocomposites (nylon-6,2 poly(ϵ-caprolactone), and epoxy) were successfully synthesized via ring-opening polymerization. The functional group in the organic cation can catalyze intralayer polymerization and facilitate layer separation.

Many thermoplastic polymers are produced by free radical polymerization using vinyl monomers, and the reaction adopts distinctly different mechanisms as compared to ring-opening polymerization. Polymerization is usually carried out in the presence of initiators. It is therefore necessary to investigate the interaction between the monomer, the initiator, and the modified clay surface in a systematic manner. Intercalated polymethyl methacrylate (hereinafter referred to as "PMMA") and polystyrene (hereinafter referred to as "PS") nanocomposites have been synthesized through either emulsion or bulk polymerization. It was found that the structural affinity between the styrene monomer and the organic cation played an important role in the PS/clay hybrid structure. Improved dispersion of clay in the PMMA/clay nanocomposites was obtained when methyl methacrylate (hereinafter referred to as "MMA") was co-intercalated and copolymerized with lauryl methacrylate (LMA). The authors attribute this improvement to a better compatibility of LMA with the organic cation functionalized clay surface. Efforts have also been made to anchor a living free radical polymerization (LFRP) initiator in the interlayer region to improve the intralayer polymerization rate, to achieve an exfoliated PS nanocomposite. Recently, a more conventional initiator, 2,2'-azo(isobutylamidine hydrochloride), was immobilized in the interlayer region to yield exfoliation of clay in the PMMA matrix, using suspension polymerization. Exfoliation of clay in PMMA was also reported in the emulsion polymerization. Our work focuses on the synthesis of exfoliated PMMA and PS/clay nanocomposites via bulk polymerization. The effects of monomer, initiator, and clay surface modification on the structure of nanocomposites are investigated.

SUMMARY OF THE INVENTION

The present invention includes: (a) a method for synthesizing 2-methacryloyloxyethylhexadecyldimethylammonium bromide; (b) a chemical compound; (c) an organophilic clay; (d) a method for preparing an exfoliated clay nanocomposite; (e) an exfoliated clay nanocomposite; (f) a method for producing an exfoliated clay nanocomposite-carrier resin mixture; and (g) an exfoliated clay nanocomposite-carrier resin mixture.

In broadest terms, a method for synthesizing 2-methacryloyloxyethylhexadecyldimethylammonium bromide (hereinafter referred to as "MHAB") comprises the steps of: (1) reacting 2-(dimethylamino)ethyl methacrylate and 1-bromohexadecane in the presence of hydroquinone monomethyl ether so as to form a precipitate; and (2) purifying said precipitate so as to isolate said 2-methacryloyloxyethylhexadecyldimethylammonium bromide. It is preferred that the reactants be provided in a 2:1 molar ratio. It is further preferred that the reaction occur at 60° C. for 24 hours. It is preferred that the hydroquinone monomethyl ether be present in a concentration of at least 1000-ppm, more preferably 3000-ppm.

The present invention also provides for a compound having the formula:

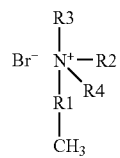

wherein: R1 is $(CH_2)_n$ wherein n ranges from 6 to 20; R2 is a chemical structure having a terminal reactive double bond;

R3 is an alkyl group; and R4 is an alkyl group. It is preferred that the compound has n equal to 15, R3 as $CH_3$, R 4 as $CH_3$, and R2 as

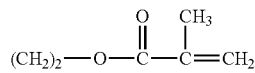

An organophilic clay mixture of the present invention comprises: a smectite clay; and a compound having the formula:

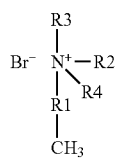

wherein: R1 is $(CH_2)_n$ wherein n ranges from 6 to 20; R2 is a chemical structure having a terminal reactive double bond; R3 is an alkyl group; and R4 is an alkyl group. It is preferred that n is 15, R3 is $CH_3$, R 4 is $CH_3$, and R2 is:

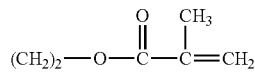

Further, it is preferred that the smectite clay is selected from the group consisting of montmorillonite, hectorite, saponite, laponite, florohectorite, beidellite. Vermiculite may also be incorporated in the nanocomposites. The inorganic clay used to prepare organophilic clay and polymer nanocomposites can be any 2:1 layered silicates with moderate surface negative charge such that use of MHAB to modify the clay surface is applicable.

The present invention also provides a method for preparing an exfoliated clay nanocomposite by in-situ polymerization comprising the steps of: (1) providing a mixture of at least one type of monomer and at least one type of organophilic clay; and (2) initiating an in-situ polymerization reaction in the mixture so as to cause at least one type of monomer to polymerize thereby forming the exfoliated clay nanocomposite, wherein the exfoliated clay nanocomposite producing an x-ray diffraction pattern substantially devoid of an intercalation peak.

While the mixture may contain from zero to 99 percent by weight of organophilic clay, it is preferred that the mixture contains at least 1-wt % of organophilic clay. It is even more preferred that the mixture contain at least 10-wt % of organophilic clay. It is most preferred that the mixture contains at least 20-wt % of organophilic clay. Further, it is preferred that the organophilic clay comprise a smectite clay. It is even more preferred that the smectite clay is selected from the group consisting of montmorillonite, hectorite, saponite, laponite, florohectorite, beidellite. It is most preferred that the clay nanocomposite be an exfoliated nanocomposite having substantially uniform mesoscale clay dispersion.

It is preferred that the at least one monomer be selected from the group consisting of styrene, methyl methacrylate, vinyl, vinylene monomer, and mixtures thereof. It is most preferred that the monomer can polymerize by free radical (chain growth) polymerization.

It is preferred that a chemical initiator initiates the polymerization reaction. It is most preferred that the chemical initiator is selected from the group consisting of benzoyl peroxide (hereinafter referred to as "BPO") and 2,2'-azobis (isobutyronitrile) (hereinafter referred to as "AIBN"). It is further preferred that the mixture additionally comprises at least one surfactant.

An exfoliated clay nanocomposite of the present invention comprises: (1) a polymeric portion; (2) and an organophilic clay portion, the organophilic clay portion dispersed throughout the polymeric portion such that an x-ray diffraction pattern produced from the exfoliated clay nanocomposite is substantially devoid of an intercalation peak.

It is preferred that the polymeric portion comprises a polymer selected from the group consisting of poly(methyl methacrylate), polystryrene, vinyl, and mixtures thereof. It is further preferred that the organophilic clay comprises smectite clay selected from the group consisting of montmorillonite, hectorite, saponite, laponite, florohectorite, beidellite. While the exfoliated clay nanocomposite may contain from zero to 99 percent by weight of organophilic clay, it is preferred that the nanocomposite contains at least 1-wt % of organophilic clay. It is even more preferred that the nanocomposite contain at least 10-wt % of organophilic clay. It is most preferred that the nanocomposite contains at least 20-wt % of organophilic clay.

It is preferred that the organophilic clay comprises: a smectite type clay; and a compound having the formula:

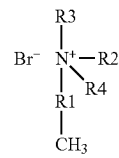

wherein R1 is $(CH_2)_n$ wherein n ranges from 6 to 20; R2 is a chemical structure having a terminal reactive double bond; R3 is an alkyl group; and R4 is an alkyl group.

It is most preferred that the exfoliated clay nanocomposite is an exfoliated nanocomposite having substantially uniform mesoscale clay dispersion.

A method of the present invention for producing an exfoliated clay nanocomposite-carrier resin mixture comprises the steps of: (1) providing an exfoliated clay nanocomposite; and (2) blending the exfoliated clay nanocomposite with a carrier resin so as to substantially disperse the clay nanocomposite throughout the carrier resin thereby forming an exfoliated clay nanocomposite-carrier resin mixture.

It is preferred that the carrier resin is selected from the group consisting of polystyrene, poly(methyl methacrylate), vinyl-based polymers, and mixtures thereof. It is further preferred that the exfoliated clay nanocomposite comprises: (1) a polymeric portion; and (2) an organophilic clay portion, wherein the organophilic clay portion is dispersed throughout the polymeric portion such that an x-ray diffraction pattern produced from the exfoliated clay nanocomposite is substantially devoid of an intercalation peak. It is also preferred that the polymeric portion comprises a polymer selected from the group consisting of poly(methyl methacrylate), polystryrene, vinyl-based polymers, and mixtures thereof. Additionally, it is preferred that the organophilic clay comprises smectite clay selected from the group consisting of montmorillonite, hectorite, saponite, laponite, florohectorite, beidellite.

While the exfoliated clay nanocomposite may contain from zero to 99 percent by weight of organophilic clay, it is preferred that the nanocomposite contains at least 1-wt % of organophilic clay. It is even more preferred that the nanocomposite contain at least 10-wt % of organophilic clay. It is most preferred that the nanocomposite contains at least 20-wt % of organophilic clay.

It is preferred the that organophilic clay comprises: a smectite type clay; and a compound having the formula:

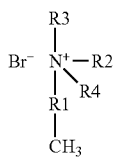

wherein: R1 is $(CH_2)_n$ wherein n ranges from 6 to 20; R2 is a chemical structure having a terminal reactive double bond; R3 is an alkyl group; and R4 is an alkyl group.

It is most preferred that the clay nanocomposite is an exfoliated nanocomposite having substantially uniform mesoscale clay dispersion.

An exfoliated clay nanocomposite-carrier resin mixture of the present invention comprises a carrier resin; and a clay nanocomposite, wherein the clay nanocomposite is substantially dispersed throughout the carrier resin.

It is preferred that the carrier resin is selected from the group consisting of polystyrene, poly(methyl methacrylate), vinyl-based polymers, and mixtures thereof.

It is further preferred that the exfoliated clay nanocomposite comprises: a polymeric portion; and an organophilic clay portion, wherein the organophilic clay portion is dispersed throughout the polymeric portion such that an x-ray diffraction pattern produced from the exfoliated clay nanocomposite is substantially devoid of an intercalation peak.

It is preferred that the polymeric portion comprises a polymer selected from the group consisting of poly(methyl methacrylate), polystryrene, vinyl-based polymers, and mixtures thereof. It is further preferred that the organophilic clay comprise a smectite clay. It is most preferred that the smectite clay is selected from the group consisting of montmorillonite, hectorite, saponite, laponite, florohectorite, beidellite.

It is further preferred that the clay nanocomposite is an exfoliated nanocomposite having substantially uniform mesoscale clay dispersion.

While the exfoliated clay nanocomposite may contain from zero to 99 percent by weight of organophilic clay, it is preferred that the nanocomposite contains at least 1-wt % of organophilic clay. It is even more preferred that the nanocomposite contain at least 10-wt % of organophilic clay. It is most preferred that the nanocomposite contains at least 20-wt % of organophilic clay.

It is further preferred that the organophilic clay comprises: a smectite clay; and a compound having the formula:

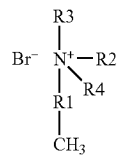

wherein: R1 is $(CH_2)_n$ wherein n ranges from 6 to 20; R2 is a chemical structure having a terminal reactive double bond; R3 is an alkyl group; and R4 is an alkyl group.

The present invention also includes nanocompsites made by any of the aforementioned methods and articles comprising the exfoliated clay nanocomposite-carrier resin mixture.

DETAILED DESCRIPTION OF THE PREFERRED EMBODIMENT(S)

In accordance with the foregoing summary, the following presents a detailed description of the preferred embodiment of the invention that is currently considered to be the best mode.

Materials. Two monomers, methyl methacrylate (MMA) and styrene (St), and two initiators, benzoyl peroxide (BPO) and 2,2'-azobis(isobutyronitrile) (AIBN), were purchased from Aldrich. All materials were used as received. An organophilic clay Cloisite 20A (20A), which is a dimethyl dihydrogenated tallow ammonium montmorillonite, was provided by Southern Clay. Na⁺-montmorillonite (Wyoming SWy2) was purchased from the Clay Source Repository, University of Missouri, Columbia. It has an ion exchange capacity of 76.4 mequiv/100 g. Another Na⁺-montmorillonite with an ion exchange capacity of 90-mequiv/100 g was obtained from Southern Clay. Polystyrene (Styon 685D from Dow Chemical) was used to prepare the PS/clay nanocomposite by extrusion compounding.

Figure 1:
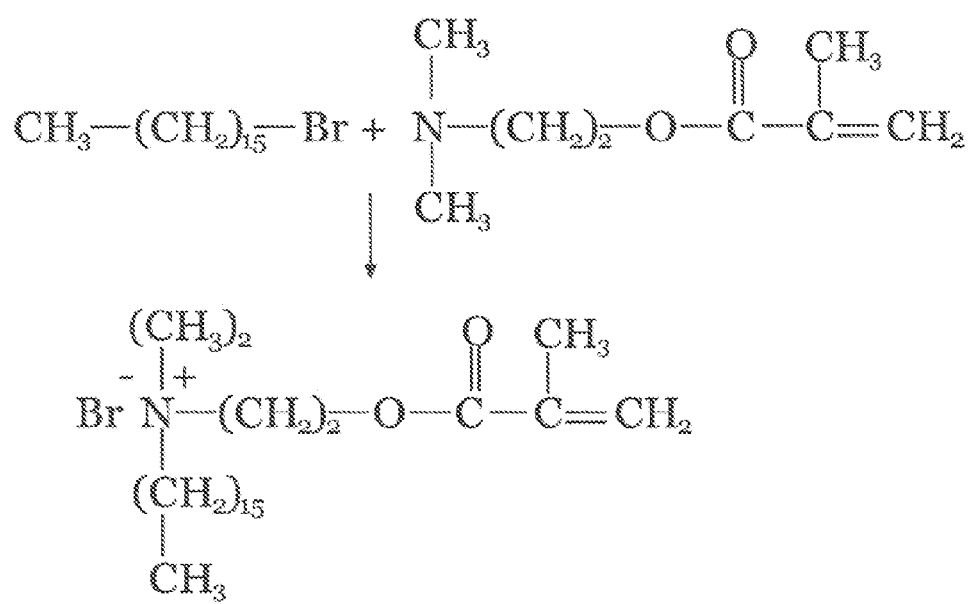
FIG. 1 shows the synthesis of the reactive cationic surfactant 2-methacryloyloxyethylhexadecyldimethylammonium bromide (MHAB).

Synthesis of Reactive Surfactant MHAB for MMT Modification. A reactive cationic surfactant 2-methacryloyloxyethylhexadecyldimethylammonium bromide (MHAB) was synthesized by the quaternarization reaction as shown in FIG. 1. 2-(Dimethylamino)ethyl methacrylate and 1-bromohexadecane (2:1 molar ratio) (Aldrich) were reacted at 60° C. for 24 h, in the presence of 3000 ppm inhibitor hydroquinone monomethyl ether (MEHQ) (Aldrich). The product is insoluble to either ingredient and thus precipitated. The white powder-like precipitant was purified by filtering and washing using ethyl acetate (Aldrich). It was then dried under vacuum at ambient temperature for 24 h.

Preparation of Organophilic Clays MHABS and MHABM. Organophilic clays were prepared by the ion exchange reaction. Ten grams of each of the sodium ion-exchanged MMTs (Na⁺-MMTs), Wyoming SWy2 from the Clay Source Repository University of Missouri, Columbia, and Na⁺-MMT from Southern Clay were dispersed in separate vessels containing 800 mL of deionized water at room temperature. MHAB was dissolved in 200 mL of deionized water and slowly poured into each clay suspension. The amount of MHAB used is 1.2 times the amount needed to fully replace the sodium cation in the Na⁺-MMT. The suspensions were stirred for 24 h at room temperature. The exchange clays were then filtered using a Busch filter and redispersed in deionized water. This procedure was repeated several times until no bromide ion was detected with 0.1 N AgNO₃ solution. The filter cake was vacuum-dried at room temperature and crushed into powder using a mortar and pestle. The organophilic MMT prepared using SWy2 is denoted as MHABM, while the one prepared using Na⁺-MMT from Southern Clay is denoted as MHABS.

Preparation of Polymer/Clay Nanocomposites. The monomer/clay mixture was sonicated for 6 h before a certain amount of initiator was added. The mixture was then sonicated for another 1 h. Alternatively, the monomer, initiator and clay may be mixed together using a high shear device. Polymerization was carried out under isothermal conditions. The reaction time varied from 4 to 20 h, depending on the reaction temperature and the type and amount of initiator added. Prepared hybrids were then postcured in an oven at 105° C. PS/20A nanocomposites were also prepared using a Leistritz ZSE-27 intermesh twin screw extruder (L/D=40, d=27 mm) operated in the co-rotating mode. The barrel temperature was set at 200° C. and the screw speed 90 rpm. Prepared nanocomposites were compared with in-situ polymerized nanocomposites at the same level of clay loading. All PS/clay nanocomposites were injection molded into tensile bars using a DACA microinjector with a barrel temperature of 220° C. and mold temperature of 85° C.

Structure Analysis of Nanocomposites. The X-ray diffraction (XRD) spectra of prepared polymer/clay nanocomposites were recorded on a Scintag XDS-2000 ⊖~⊖ X-ray diffractometer equipped with an intrinsic germanium detector system using Cu Kα radiation (~=1.5418 nm). Transmission electron microscopy (TEM) was also adopted to characterize the nanocomposites structure. Unless otherwise specified, TEM was performed on a Phillip CM200 using an accelerating voltage of 200 kV. The nanocomposite samples were sectioned into ultrathin slices (<100 nm) at room temperature using a microtome equipped with a diamond knife and then mounted on 200 mesh copper grids.

Dimension Stability at Elevated Temperature. Portions of injection molded tensile bars were placed in an oven and heated to the following temperatures: 50, 75, 105, and 135° C., each for 1 h, for a total of 4 h. Sample dimensions before and after the thermal cycle were imaged using a digital camera.

Figure 2:
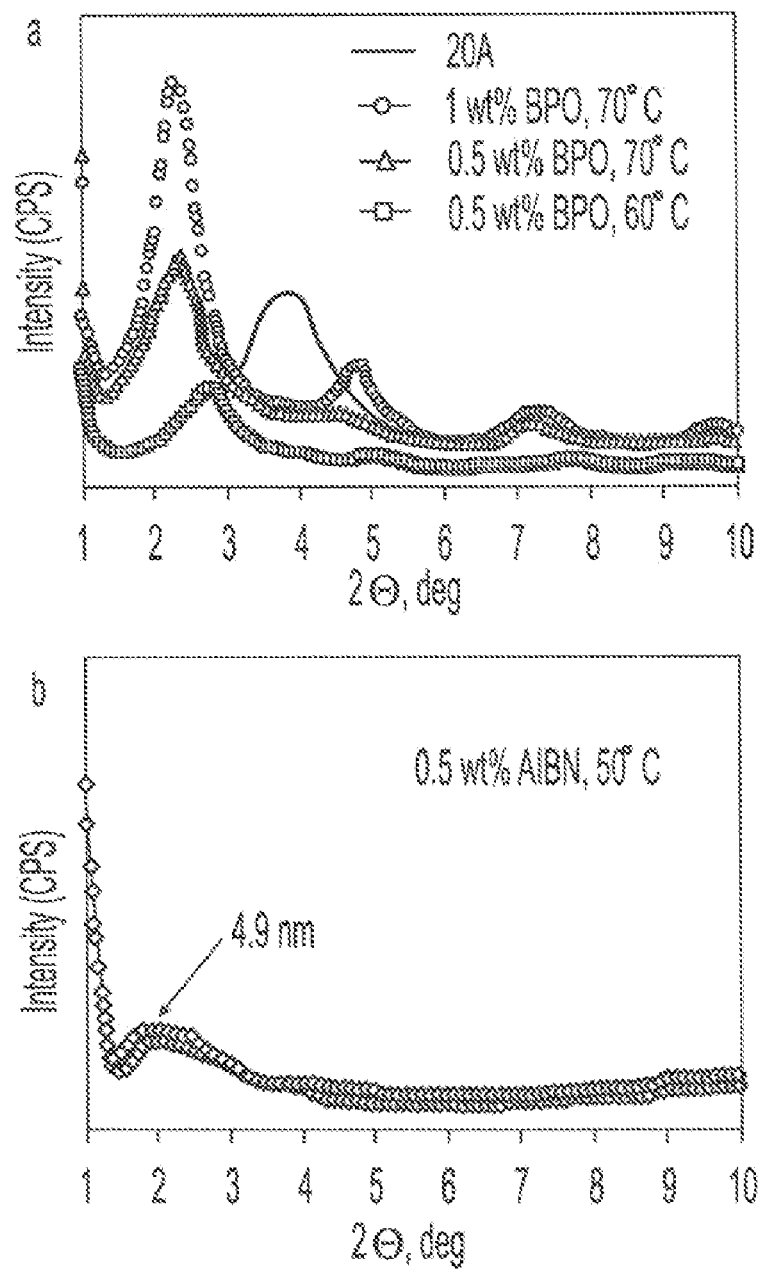
FIG. 2(a) compares the x-ray diffraction (XRD) patterns of inventive nanocomposites using differing amounts of BPO as the initiator to the commercial organoclay Cloisite 20A (hereinafter "20A") from Southern Clay Inc. The 20A's surface is modified by dimethyl dehydrogenated tallow ammonium salt.
FIG. 2(b) provides the XRD pattern of another inventive nanocomposite using 0.5 wt % of AIBN as the initiator.
Figure 3:
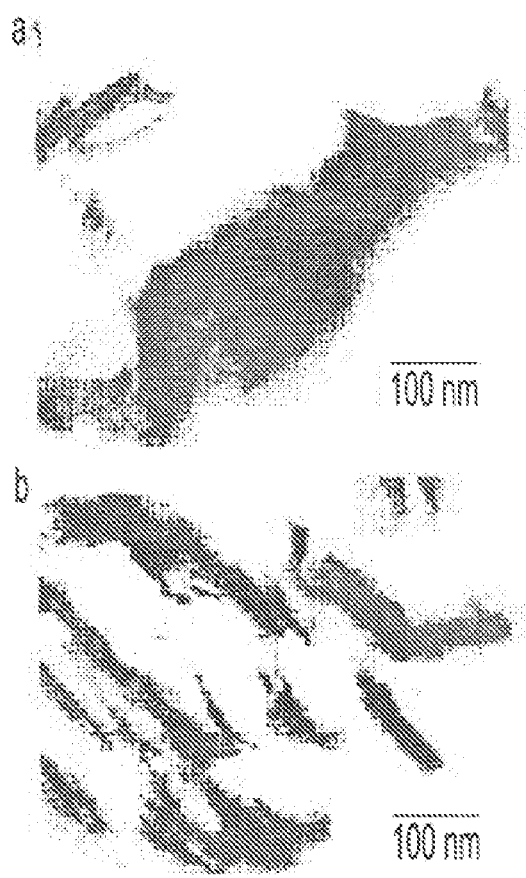
FIG. 3 provides transmission electron microscopy (TEM) micrographs of inventive nanocomposites prepared under different reaction conditions: (a) initiator, 1 wt % BPO, temperature 70° C.; (b) initiator, 0.5 wt % AIBN, temperature 50° C.
Figure 4:
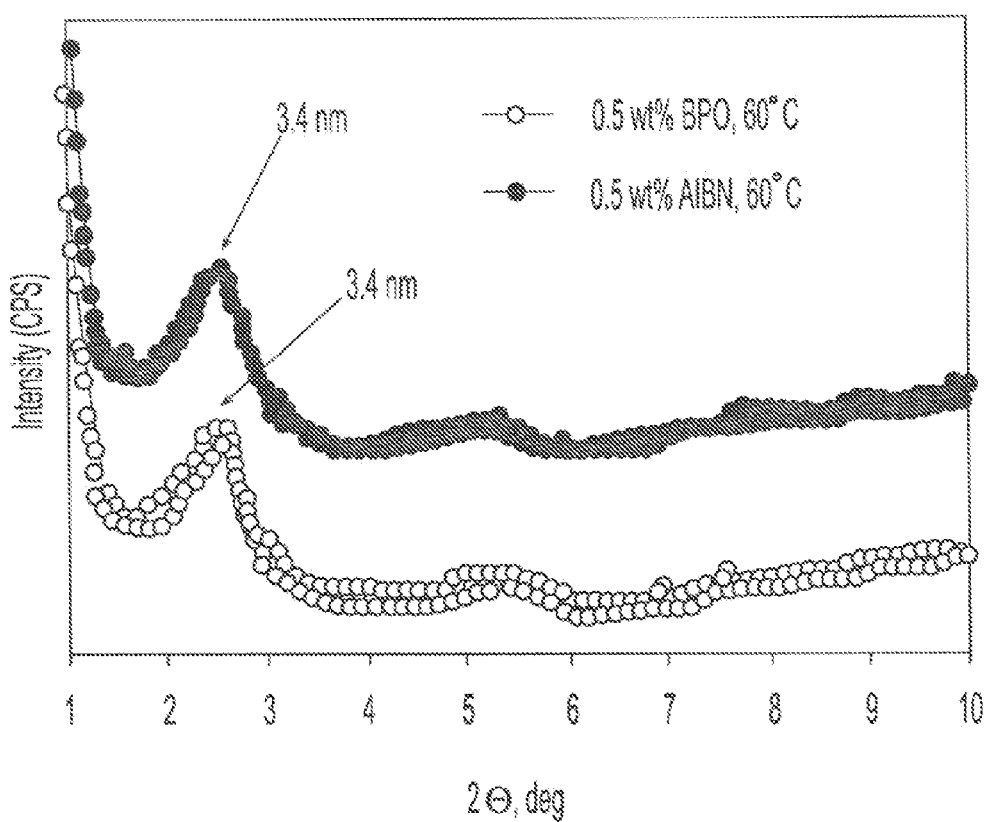
FIG. 4 compares the XRD patterns of two inventive nanocomposites. The curves are vertically offset for clarity.

Effect of Initiators and Monomers. The clay 20A was used to prepare PMMA/clay nanocomposites. It has an interlayer spacing of d=2.3 nm. FIG. 2(a) compares the XRD spectra of the nanocomposites prepared with different amounts of BPO at two temperatures, and the interlayer spacing for the nanocomposites is listed in Table 1 below. In each case, clay content was fixed at 5-wt %, and a distinct basal reflection (d001) peak was observed, indicating that an intercalated nanocomposite was obtained. The nanocomposites prepared at 60° C. showed a slightly smaller interlayer spacing (d=3.5 nm) than the other two (d=3.6 nm). In the range of experimental conditions, varying the initiator amount and reaction temperature did not result in a substantial alteration of the interlayer spacing. Polymerization was also conducted at 50° C., using AIBN as the initiator, and the XRD pattern of the prepared nanocomposite is shown in FIG. 2(b). Only a very weak and broad peak at d=4.9 nm is present, indicating a highly disordered intercalated nanocomposite with greater layer separation and a reduced extent of layer stacking. This is also supported by the TEM observation. FIG. 3a is the TEM micrograph of a PMMA/20A (5 wt %) nanocomposite prepared using 1 wt % BPO as the initiator at 70° C. The dark lines are the clay layers perpendicular to the sample surface. Large clay aggregates (particles) are visible, although the interlayer spacing is expanded. On the other hand, the nanocomposite prepared by using 0.5 wt % AIBN as the initiator at 50° C. shows much better clay dispersion (FIG. 3b). While the individual clay layer is visible, small aggregates can still be observed in some regions. The clay platelets are flexible and show substantial curvature in many instances. PS/20A nanocomposites with a clay content of 5 wt % were also prepared using these two initiators, and the XRD spectra of the resulting nanocomposites are shown in FIG. 4. Both nanocomposites show a diffraction peak with an identical interlayer spacing of d=3.4 nm. Improved dispersion of the clay in the PMMA matrix was achieved when AIBN was used. On the other hand, the basal spacing of PS/20A nanocomposites was found to be independent of the choice of initiator.

TABLE 1

Summary of Interlayer Spacing of 20A and PMMA/20A Nanocomposites Shown in FIG. 2(a). Clay loading is 5-wt % in each of the nanocomposites.

| Material | 20A | MMA/1 wt % BPO/20A | MMA/0.5 wt % BPO/20A | MMA/0.5 wt % BPO/20A |
|---|---|---|---|---|
| Reaction temp (° C.) | | 70 | 70 | 60 |
| Interlayer spacing (nm) | 2.3 | 3.6 | 3.6 | 3.5 |

In the monomer/initiator/organophilic clay systems discussed here, the interactions of both initiator and monomer with the organophilic clay need to be considered. AIBN possesses two highly polar nitrile groups, leading to a higher polarity than BPO. The presence of two benzene rings makes BPO more hydrophobic than AIBN. The MMT clay surface is polar and hydrophilic in nature. During the ion exchange reaction, the hydrophilic nature decreases as the organic cations replace the original inorganic cations. However, a portion of the clay surface may not be covered by the organic cation, which makes the surface-treated clay still more compatible with polar molecules. As a result, the AIBN/MMA/clay system has a better clay dispersion than the BPO/MMA/clay system.

The failure to achieve better clay dispersion in PS using AIBN as the initiator implies that the compatibility of the monomer with the organophilic clay is also an important factor. MMA contains both a low polar portion (methacryl group) and a high polar portion (ester group). The polarity of MMA is higher than that of styrene, as verified by the dipole moment difference of the two ($\mu$(MMA)=1.7 D, $\mu$(St)=0.37 D). Blumstein and Solomon et al. showed that MMA has a stronger compatibility with the polar clay surface than styrene. The organic cation in 20A contains a positively charged ammonium headgroup and a nonpolar aliphatic chain. Upon MMA intercalation, more favorable interaction between MMA and clay surface may be established due to their polar nature. In addition, the van der Waals interaction is also established between the low polar methacryl group and the nonpolar alkyl chain in the organic cations. It has been shown that media that possess both polar and nonpolar characteristics had excellent ability to swell and disperse ammonium onium modified organophilic MMT. This is why polar additives are widely used to enhance the dispersion of organophilic clay in nonpolar hydrocarbon.

Figure 5:
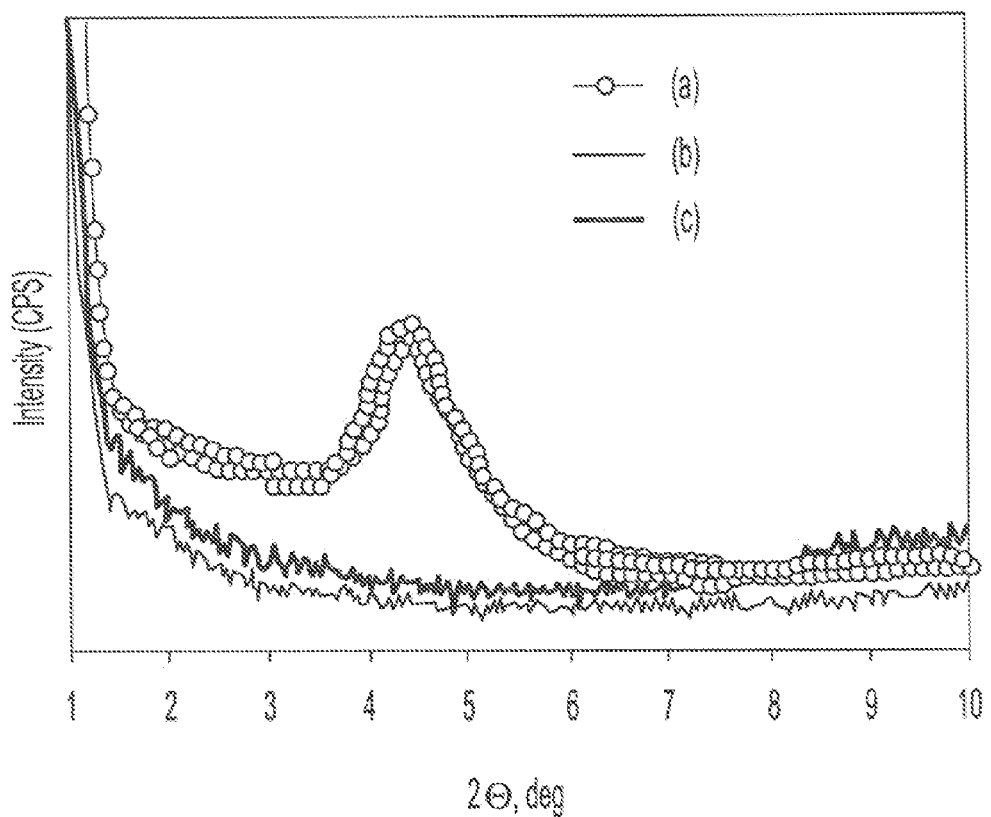
FIG. 5 compares the XRD pattern of three inventive nanocomposites.
Figure 6:
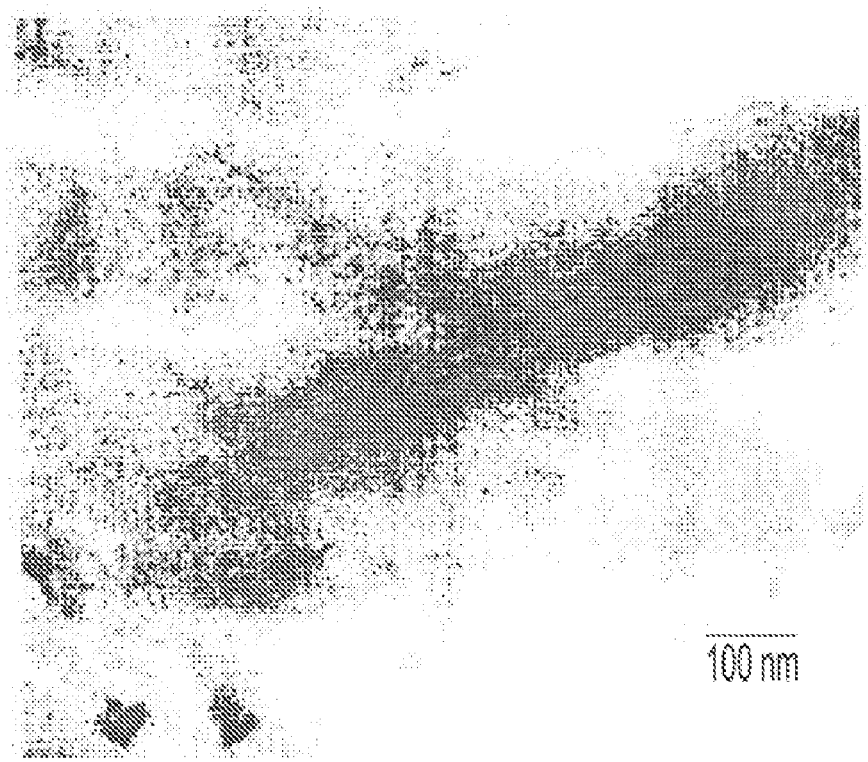
FIG. 6 is a TEM micrograph of an inventive nanocomposite. The image corresponds to curve (b) from FIG. 5.

Effect of Surface Modification. The organophilic clay MHABM was synthesized as mentioned in the Experimental Section, and the X-ray diffraction pattern is shown in FIG. 5 (curve a). Compared to the basal spacing of $Na^+$-MMT (0.95 nm), the increase of the basal spacing (d=1.95 nm) clearly shows the intercalation of the reactive cation into the interlayer region. The PMMA/clay nanocomposite was prepared using 5-wt % MHABM. Polymerization was carried out at 50° C. with 0.5 wt % AIBN as the initiator. The resultant nanocomposite exhibits a featureless XRD pattern, as shown in FIG. 5 (curve b), suggesting possible exfoliation. The TEM micrograph in FIG. 6 of the PMMA/MHABM (5-wt %) nanocomposite clearly shows that individual clay platelets are randomly distributed in the PMMA matrix. A small amount of stacking of several layers with substantial layer separation is also visible.

Figure 7:
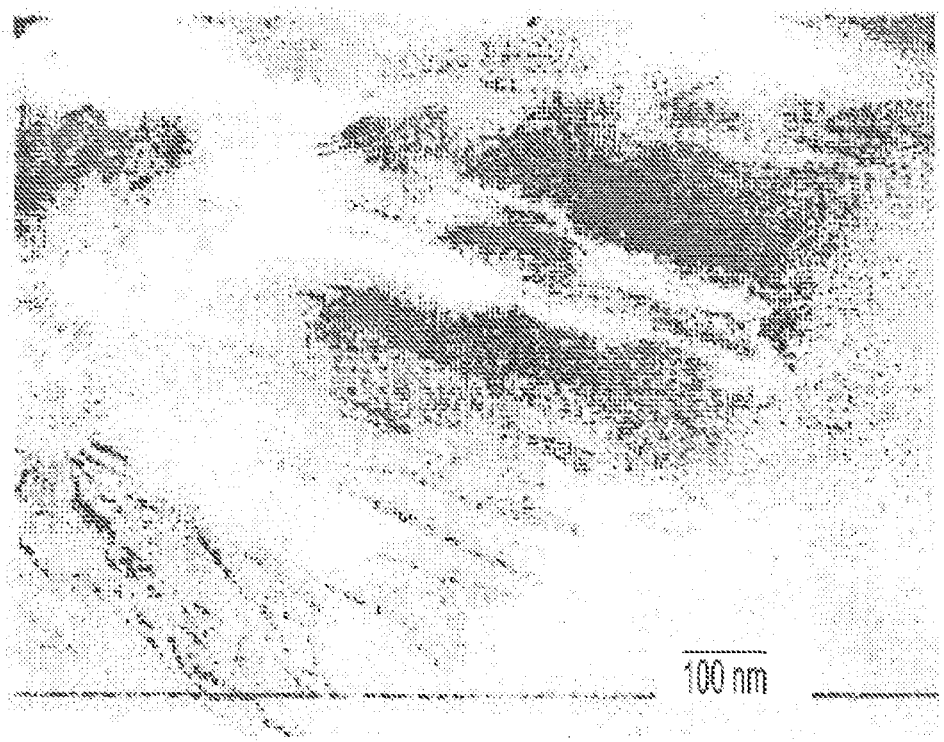
FIG. 7 is a TEM micrograph of an inventive nanocomposite. The image corresponds to curve (c) from FIG. 5.

The PS/MHABM (5-wt %) nanocomposite was prepared in the presence of 0.5 wt % AIBN at 60° C. The XRD pattern of the resulting nanocomposite (FIG. 5, curve c) reveals exfoliation, as verified by the absence of any diffraction peaks. This was further confirmed by the TEM micrograph shown in FIG. 7 of the PS/MHABM (5 wt %) nanocomposite. All of the clay tactoids have been disrupted and uniformly distributed in the PS matrix.

Figure 9:
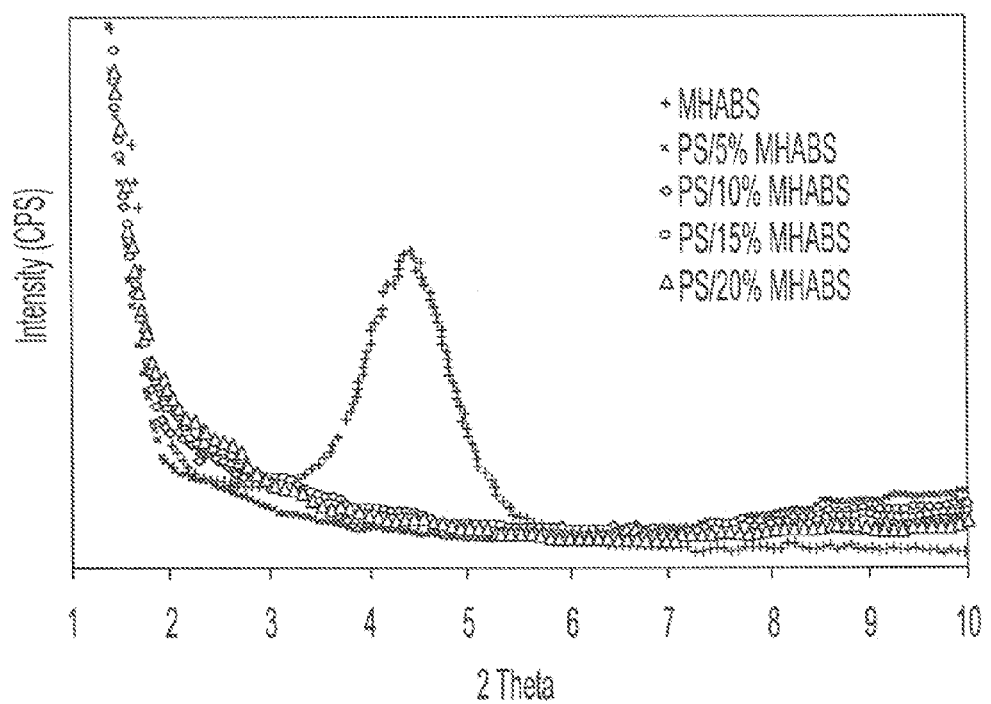
FIG. 9 provides XRD patterns of MHABS and several inventive nanocomposites.
Figure 10:
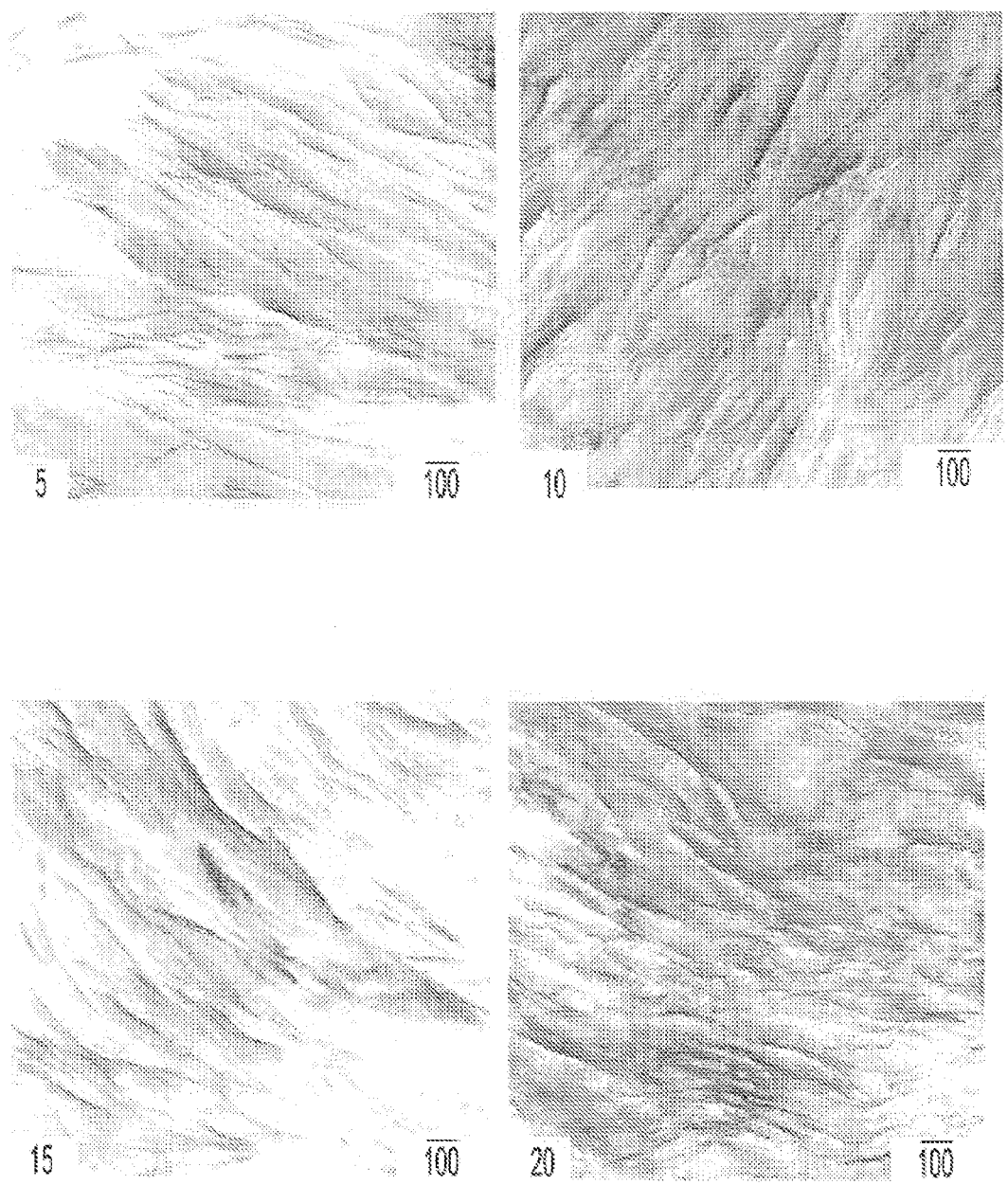
FIG. 10 provides TEM micrographs of inventive nanocomposites having an MHABS content of (a) 5-wt %, (b) 10-wt %, (c) 15-wt %, (d) 20-wt %.

PS/MHABS nanocomposites were prepared in the presence of 0.5-wt % AIBN at 60° C. The XRD pattern of the resulting nanocomposites, as shown in FIG. 9, reveals exfoliation of the clay in the polymer matrix for clay concentration as high as 20-wt %, as verified by the absence of any diffraction peaks. (FIG. 9 also provides the XRD pattern for MHABS for comparison.) This was further confirmed by TEM micrographs shown in FIG. 10. All of the clay tactoids have been disrupted and uniformly distributed in the PS matrix.

In a way similar to an immobilized initiator in the interlayer region, an anchored organic surfactant with polymerizable groups may provide an additional kinetic driving force for layer separation. We suspect that copolymerization of the intercalated monomer and the organic cation may gradually push the layers apart, leading to delamination of clay tactoids. In addition to the kinetic driving force, the structural similarity of the organic cation and styrene may result in a stronger interaction and lead to improved swelling of the clay.

Figure 8:
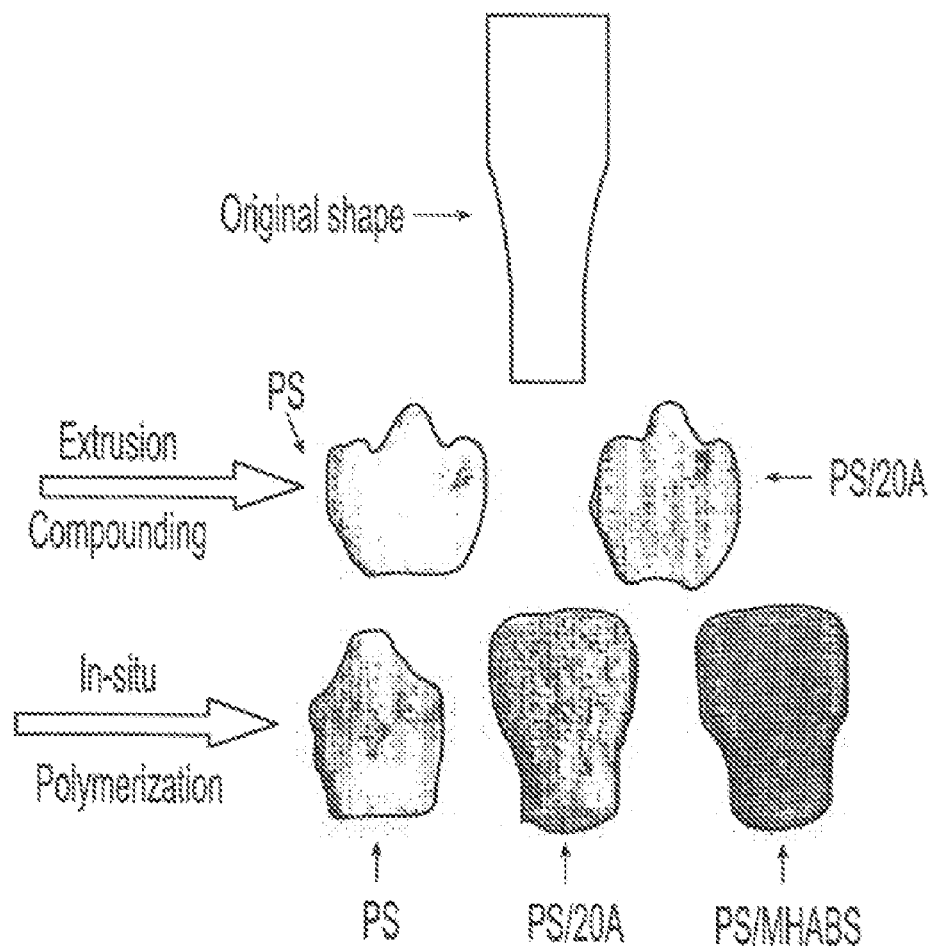
FIG. 8 compares the PS and PS/clay nanocomposites after dimension stability test. Clay loading is 5 wt % for all nanocomposites.

Dimension Stability at Elevated Temperature of PS/Clay Nanocomposites. FIG. 8 shows the shape changes of injection molded PS and PS/clay nanocomposites under the aforementioned thermal cycle (50° C., 1 h; 75° C., 1 h; 105° C., 1 h; and 135° C., 1 h). The original sample shape is shown in the first row. Pure PS (Styron 685D) and the extruded PS/20A nanocomposite are shown in the second row for comparison. The third row shows the in-situ polymerized pure PS, PS/20A, and PS/MHABS nanocomposites. All the nanocomposites contain 5-wt % clay. In all cases, reaction was conducted at 60° C. with 0.5 wt % AIBN. In the absence of clay, the sample shrank greatly, and the shape became highly irregular. Dimension stability at elevated temperature was improved significantly when 5 wt % of clay was present in the in-situ polymerized nanocomposites, as shown in the third row. The exfoliated PS/MHABM exhibited the best dimensional stability. After the heating cycle, although the sample shrank to a certain extent, the original shape and surface smoothness remained. It is noteworthy that the PS/20A nanocomposite prepared by extrusion compounding (in the second row of FIG. 8) did not show much improvement in dimension stability at elevated temperature, as compared to the in-situ polymerized PS/20A nanocomposite with the same clay loading.

The X-ray diffraction spectra for various weight percentages of MHABS in PS are shown in FIG. 9. A baseline for the MHABS is included showing a peak. Note that the patterns for the MHABS loaded PS are very similar to one another.

There are apparently two levels of clay dispersion and distribution in the polymer matrix. The first is nanoscale dispersion, involving layer separation of the clay. The chemical compatibility and physical interaction between the treated clay surface and intercalated species determine the degree of layer separation. The second level, the mesoscale distribution of clay, involves the disruption of clay aggregates and primary particles. It affects the long-range clay structure and polymer matrix-clay interaction. It is also a time and mixing strength dependent process. FIG. 10a (TEM) shows a 5-wt % PS/MHABS nanocomposite. FIG. 10b illustrates a 10-wt % PS/MHABS nanocomposite. FIG. 10c provides a TEM micrograph for a 15-wt % PS/MHABS nanocomposite. While FIG. 10d shows a 20-wt % PS/MHABS nanocomposite. During sonication, the viscosity of the monomer/clay mixture kept increasing and gelation occurred. This is an indication of network formation by the disruption and dispersion of clay aggregates. Better dispersion of clay at the mesoscale in the in-situ polymerized nanocomposite results in better reinforcement of the matrix, leading to higher dimension stability. Disruption of the clay tactoids (exfoliation) provides a large increase of effective aspect ratio and surface area, resulting in further reinforcement.

Figure 11:
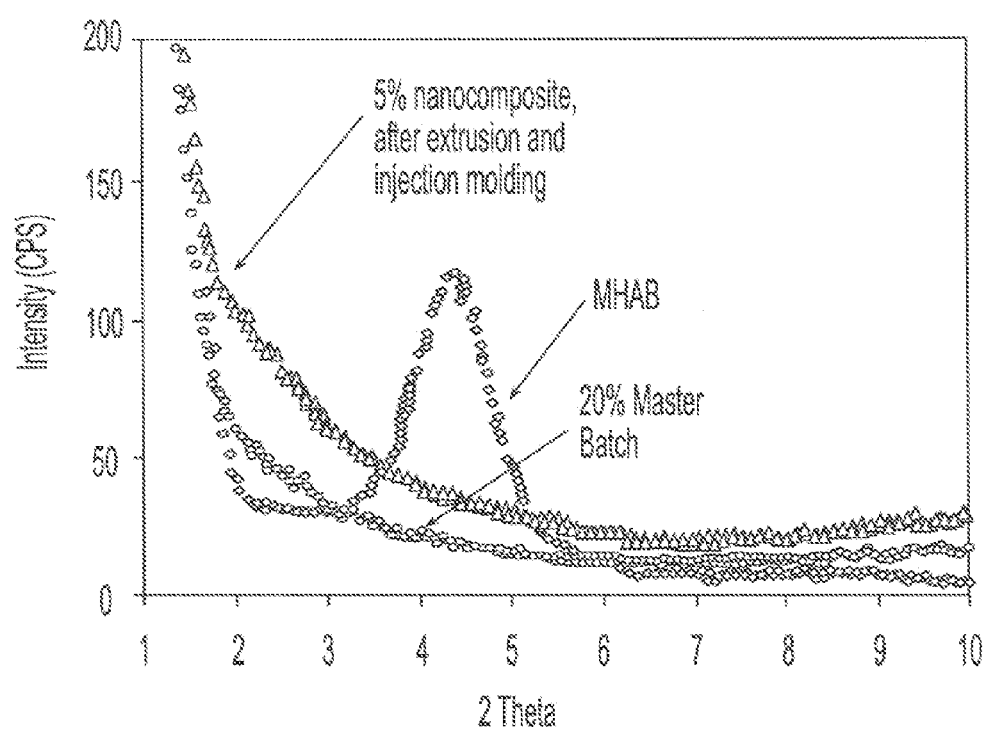
FIG. 11 shows that the exfoliated nanocomposite with desired clay content can be prepared by blending exfoliated nanocomposite masterbatch with another resin.

PS/20-wt % PS/nanocomposite was prepared by in-situ polymerization and was used as a masterbatch to blend with fresh neat resin. This two-stage method is capable of producing exfoliated nanocomposites with desired clay concentration, while at the same time reducing the workload of manufacturing exfoliated nanocomposites (polymerization is much more difficult to implement than blending). FIG. 11 compares XRD patterns for MHABS, PS/20-wt % MHABS masterbatch and PS/5-wt % nanocomposite prepared by this two-stage method. There is no diffraction peak in the PS/5-wt % nanocomposite indicating that the exfoliated dispersion is well preserved.

Conclusions. PMMA and PS/clay nanocomposites incorporating with organo-modified clays were prepared by in-situ polymerization. It was found that the polarity and hydrophilicity of the initiators and monomers greatly affect dispersion of the clay. The combined use of a more polar, less hydrophobic monomer and initiator leads to better clay layer separation and a more disordered intercalated nanocomposite. This is a result of the favorable interactions of the clay surface with both the monomer and the initiator. Introducing polymerizable groups onto the clay surface improved the clay dispersion significantly, and exfoliated PMMA and PS/clay nanocomposites were successfully synthesized with a clay concentration of 5-wt %. The presence of clay can substantially improve the dimension stability of the polymer matrix in an exfoliated nanocomposite with uniform mesoscale clay dispersion.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

REFERENCES

The following references are hereby incorporated by reference:

1. Usuki, A.; Kawasumi, M.; Kojima, Y.; Okada, A.; Kurauchi, T.; Kamigaito, 0. *J. Mater. Res.* 1993, 8, 1174.
2. Usuki, A.; Kojima, Y.; Kawasumi, M.; Okada, A.; Fukushima, Y.; Kurauchi, T.; Kamigaito, 0. *J. Mater. Res.* 1993, 8,1180.
3. Kojima, Y.; Usuki, A.; Kawasumi, M.; Okada, A.; Fukushima, Y.; Kurauchi, T.; Kamigaito, 0. *J. Mater. Res.* 1993, 8,1185.
4. Pinnavaia, T. J.; Lan, T.; Wang, Z.; Shi, H.: Kaviratna, P. D. *ACS Symp. Ser.* 1996, 622, 250.
5. Lan, T.: Pinnavaia, T. *J. Chem. Mater.* 1994, 6, 2216.
6. Shi, H.; Lan, T.; Pinnavaia, T. *J. Chem. Mater.* 1996, 8,1584.
7. Wang, Z.; Pinnavaia; T. *J. Chem. Mater.* 1998, 10, 1820.
8. Okada, A.; Usuki, A. *Mater. Sci. Eng.* 1995, C3,109.
9. Messersmith, P.; Giannelis, E. P. *Chem. Mater.* 1994, 6,1719.
10. Gilman, J. W. *Appl. Clay Sci.* 1999, 15, 3 1.
11. Dietsche, F.; Mülhaupt, R. *Polym. Bull.* 1999, 43, 395.
12. Porter, D.; Metcalfe, E.; Thomas, M. J. K. *Fire Mater.* 2000, 24,45.
13. Gilman, J. W.; Jackson, C. L.; Morgan, A. B.; Harris, R.; Manias, E.; Giannelis, E. P.; Wuthenow, M. *Chem. Mater.* 2000, 12, 1866.
14. Yano, K.; Kojima, Y.; Usuki, A.; Okada, A.: Kurauchi, T.; Kamigaito, 0. *J. Polyrn. Sci., Part A: Polym. Chem.* 1993, 31, 2493.
15. Lan, T.; Kaviratna, P. D.; Pinnavaia, T. *J. Chem. Mater.* 1994, 6,573.
16. Messersmith, P. B.; Giannelis, E. P. *J. Polym. Sci., Part A: Polym. Chem.* 1995, 33, 1047.
17. Giannelis, E. P. *Adv. Mater.* 1996, 8,29.
18. Krishnamoorti, R.; Vaia, R. A.; Ciannelis, E. P. *Chem. Mater.* 1996, 8, 1728.
19. Vaia, R. A.; Giannelis, E. P. *Macromolecules* 1997, 30, 7990.
20. Vaia, R. A.; Giannelis, E. P. *Macromolecules* 1997, 30, 8000.
21. Balazs, A. C.; Singh, C.: Zhulina, E. *Macromolecules* 1998, 31,8370.
22. Ginzburg, V. V.; Balazs, A. C. *Macromolecules* 1999, 32, 568 1.
23. Ginzburg, V. V.; Singh, C.; Balazs, C. *Macromolecules* 2000, 33, 1089.
24. Lan, T.; Kaviratna, P. D.; Pinnavaia, T. *J. Chem. Mater.* 1995, 7, 2144.
25. Brown, J. M.; Curliss, D.; Vaia, R. A. *Chem. Mater.* 2000, 12,3370.
26. Wang, M. S.; Pinnavaia, T. *J. Chem. Mater.* 1994, 6, 468.
27. Flory, P. J. *Principle of Polymer Chemistry*, Cornell University Press: New York, 1967.
28. Noh, M. W.; Lee, D. C. *Polym. Bull.* 1999, 42, 619.
29. Lee, D. C.: Jang, L. W. *J. Appl. Polym. Sci.* 1996, 61, 1117.
30. Okamoto, M.: Moritaa, S.; Taguchi, H.; Kim, Y. H.; Kataka, T.; Tateyama, H. *Polymer* 2000, 41, 3887.
31. Biasci, L.; Alietto, M.; Ruggeri, G.; Ciardelli, F. *Polymer* 1994, 35, 3296.
32. Doh, J. G.; Cho, 1. *Polym. Bull.* 1998, 41, 511.
33. Dietsche, F.; Thomann, Y.; Thomann, R.; MQlhaupt, T. *J Appl. Polym. Sci.* 2000, 75, 396.
34. Weimer, M. W.; Chen, H.; Giannelis, E. P.; Sogah, D. Y. *J. Am. Chem. Soc.* 1999,121,1615.
35. Huang, X.; Brittain, W. *J. Polym. Prepr. (Am. Chem. Soc., Div. Polym. Chem.)* 2000, 41, 52 1.
36. Bandyopadhyay, S.; Giannelis, E. P.; Hsieh, A. *J. Polym. Mater. Sci. Eng.* 2000, 82, 208.
37. Brindley, G. W.; Brown, G. *Crystal Structures of Clay Minerals and Their X-ray Identification*; Mineralogical Society: London, 1980.
38. Moore, D. M.; Reynolds, R. C. *X-ray Diffraction and the Identification and Analysis of Clay Minerals*; Oxford University Press: New York, 1989.
39. Theng, B. K. *The Chemistry of Clay-Organic Reactions*; John Wiley & Sons: New York, 1974.
40. Blumstein, A. *J. Polym. Sci., Part A* 1965, 3, 2653.
41. Solomon, D. H.; Rosser, M. J. *J. Appl. Polym. Sci.* 1965, 9, 1261.
42. Solomon, D. H.: Loft, B. C. *J. Appl. Polym. Sci.* 1968, 12, 1253.
43. Slabaugh, W. H.; St. Clair, A. D. *J. Colloid Interface Sci.* 1969, 29,586.
44. Cody, C. A.: Reichert, W. W. *NLGI Spokesman* 1986, 49,437.
45. Magauran, E. D.; Kieke, M. D.; Reichert, W. W.; Chiavoni, A. *NLGI Spokesman* 1987, 50, 453.
46. Fu, X.; Qutubuddin, S. *Polymer* 2001, 42, 807.
47. Vaia, R. A.; Jandt, K. D.; Kramer, E. J.; Giannelis, E. P. *Macromolecules* 1995, 28, 8080.
48. Vaia, R. A.; Jandt, K. D.; Kramer, E. J.: Giannelis, E. P. *Chem. Mater.* 1996, 8,2628.
49. Krishnamoorti, R.: Giannelis, E. P. *Macromolecules* 1997, 30, 4097.
50. Ren, J.; Silva, A. A. S.; Krishnamoorti, R. *Macromolecules* 2000, 33, 3739.
51. Cho, J. W.; Paul, D. R. *Polymer* 2001, 42,1083.

52. Olphen, H. v. *An Introduction to Clay Colloid Chemistry*; John Wiley & Sons: New York, 1963.

What is claimed is:

1. A method for synthesizing 2-methacryloyloxyethylhexadecyldimethylammonium bromide, said method comprising the steps of:
    reacting 2-(dimethylamino)ethyl methacrylate and 1-bromohexadecane in the presence of hydroquinone monomethyl ether so as to form a precipitate; and
    purifying said precipitate so as to isolate said 2-methacryloyloxyethylhexadecyldimethylammonium bromide.

2. A compound having the formula:

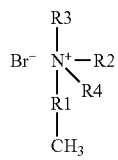

wherein:
    R1 is $(CH_2)_n$ wherein n ranges from 6 to 20;
    R2 is a chemical structure having a terminal reactive double bond;
    R3 is an alkyl group; and
    R4 is an alkyl group.

3. The compound of claim 2 wherein n is 15, R3 is $CH_3$, R 4 is $CH_3$, and R2 is

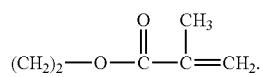

4. A organophilic clay mixture, said organophilic clay mixture comprising:
    a smectite clay; and
    a compound having the formula:

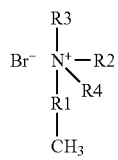

wherein:
    R1 is $(CH_2)_n$ wherein n ranges from 6 to 20;
    R2 is a chemical structure having a terminal reactive double bond;
    R3 is an alkyl group; and
    R4 is an alkyl group.

5. The organophilic clay according to claim 4 wherein n is 15, R3 is $CH_3$, R 4 is $CH_3$, and R2 is:

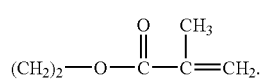

6. The organophilic clay according to claim 4 wherein said smectite clay is selected from the group consisting of montmorillonite, hectorite, saponite, laponite, florohectorite, and beidellite.

7. A method for preparing an exfoliated clay nanocomposite by in-situ polymerization, said method comprising the steps of:
    providing a mixture of at least one type of monomer and at least one type of organophilic clay mixture, said organophilic clay mixture comprising:
    a compound having the formula:

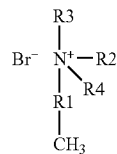

wherein:
    R1 is $(CH_2)_n$ wherein n ranges from 6 to 20;
    R2 is a chemical structure having a terminal reactive double bond;
    R3 is an alkyl group; and
    R4 is an alkyl group; and
    initiating an in-situ polymerization reaction in said mixture so as to cause said at least one type of monomer to polymerize thereby forming said exfoliated clay nanocomposite, said exfoliated clay nanocomposite producing an x-ray diffraction pattern substantially devoid of an intercalation peak.

8. The method according to claim 7 wherein said mixture comprises at least 15 weight percent of said organophilic clay.

9. The method according to claim 7 wherein said clay nanocomposite is an exfoliated nanocomposite having substantially uniform mesoscale clay dispersion.

10. The method according to claim 7 wherein said polymerization reaction is initiated by a chemical initiator.

11. The method according to claim 10 wherein said chemical initiator is selected from the group consisting of benzoyl peroxide and 2,2'-azobis(isobutyronitrile).

12. The method according to claim 7 wherein said organophilic clay comprises smectite clay selected from the group consisting of montmorillonite, hectorite, saponite, laponite, florohectorite, and beidellite.

13. The method according to claim 7 wherein said mixture additionally comprises at least one surfactant.

14. The method according to claim 7 at least one of said at least one monomer is selected from the group consisting of styrene, methyl methacrylate, ethylene, vinylene monomer, and mixtures thereof.

15. A clay nanocomposite prepared according to the method of claim 7.

16. An exfoliated clay nanocomposite, said exfoliated clay nanocomposite comprising:
    a polymeric portion; and
    an organophilic clay portion, said organophilic clay portion dispersed throughout said polymeric portion such that an x-ray diffraction pattern produced from said exfoliated clay nanocomposite is substantially devoid of an intercalation peak, said organophilic clay portion comprising:
    a compound having the formula:

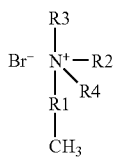

wherein:
R1 is $(CH_2)_n$ wherein n ranges from 6 to 20;
R2 is a chemical structure having a terminal reactive double bond;
R3 is an alkyl group; and
R4 is an alkyl group.

17. The exfoliated clay nanocomposite according to claim 16 wherein said polymeric portion comprises a polymer selected from the group consisting of poly(methyl methacrylate), polystryrene, vinyl-based polymers, and mixtures thereof.

18. The exfoliated clay nanocomposite according to claim 16 wherein said organophilic clay comprises a smectite clay selected from the group consisting of montmorillonite, hectorite, saponite, laponite, florohectorite, and beidellite.

19. The exfoliated clay nanocomposite according to claim 16 wherein said wherein said clay nanocomposite is an exfoliated nanocomposite having a substantially uniform mesoscale clay dispersion.

20. The exfoliated clay nanocomposite according to claim 16 wherein said clay nanocomposite comprises at least 15 weight percent of said organophilic clay.

21. A method for producing an exfoliated clay nanocomposite-carrier resin mixture, said method comprising the steps of:
providing an exfoliated clay nanocomposite, said exfoliated clay nanocomposite comprising:
a polymeric portion; and
an organophilic clay portion, said organophilic clay portion dispersed throughout said polymeric portion such that an x-ray diffraction pattern produced from said exfoliated clay nanocomposite is substantially devoid of an intercalation peak, said organophilic clay mixture comprising:
a compound having the formula:

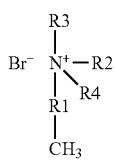

wherein:
R1 is $(CH_2)_n$ wherein n ranges from 6 to 20;
R2 is a chemical structure having a terminal reactive double bond;
R3 is an alkyl group; and
R4 is an alkyl group; and
blending said exfoliated clay nanocomposite with a carrier resin so as to substantially disperse said clay nanocomposite throughout said carrier resin thereby forming said exfoliated clay nanocomposite-carrier resin mixture.

22. The method according to claim 21 wherein said carrier resin is selected from the group consisting of polystyrene, poly(methyl methacrylate), vinyl-based polymers, and mixtures thereof.

23. The method according to claim 21 wherein said polymeric portion comprises a polymer selected from the group consisting of poly(methyl methacrylate), polystryrene, vinyl-based polymers, and mixtures thereof.

24. The method according to claim 21 wherein said organophilic clay comprises a smectite clay selected from the group consisting of montmorillonite, hectorite, saponite, laponite, florohectorite, and beidellite.

25. The method according to claim 21 wherein said clay nanocomposite is an exfoliated nanocomposite having a substantially uniform mesoscale clay dispersion.

26. The method according to claim 21 wherein said clay nanocomposite comprises at least 15 weight percent of said organophilic clay.

27. An exfoliated clay nanocomposite-carrier resin mixture prepared according to the method of claim 21.

28. An exfoliated clay nanocomposite-carrier resin mixture, said mixture comprising:
a carrier resin; and
an exfoliated clay nanocomposite, said exfoliated clay nanocomposite substantially dispersed throughout said carrier resin, said exfoliated clay nanocomposite comprises:
a polymeric portion; and
an organophilic clay portion, said organophilic clay portion dispersed throughout said polymeric portion such that an x-ray diffraction pattern produced from said exfoliated clay nanocomposite is substantially devoid of an intercalation peak, said organophilic clay mixture comprising:
a compound having the formula:

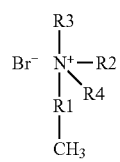

wherein:
R1 is $(CH_2)_n$ wherein n ranges from 6 to 20;
R2 is a chemical structure having a terminal reactive double bond;
R3 is an alkyl croup; and
R4 is an alkyl group.

29. The exfoliated clay nanocomposite-carrier resin mixture of claim 28 wherein said carrier resin is selected from the group consisting of polystyrene, poly(methyl methacrylate), vinyl-based polymers, and mixtures thereof.

30. The exfoliated clay nanocomposite-carrier resin mixture according to claim 28 wherein said polymeric portion comprises a polymer selected from the group consisting of poly(methyl methacrylate), polystryrene, vinyl-based polymers, and mixtures thereof.

31. The exfoliated clay nanocomposite-carrier resin mixture according to claim 28 wherein said organophilic clay comprises smectite clay.

32. The exfoliated clay nanocomposite-carrier resin mixture according to claim 28 wherein said exfoliated clay nanocomposite has a substantially uniform mesoscale clay dispersion.

33. The exfoliated clay nanocomposite-carrier resin mixture according to claim 28 wherein said clay nanocomposite comprises at least 15 weight percent of said organophilic clay.

34. An article comprising said exfoliated clay nanocomposite-carrier resin mixture of claim 28.

35. The exfoliated clay nanocomposite-carrier resin mixture according to claim 31 wherein said smectite clay is selected from the group consisting of montmorillonite, hectorite, saponite, laponite, florohectorite, and beidellite.

* * * * *